United States Patent [19]

Savage, Sr.

[11] 4,275,548
[45] Jun. 30, 1981

[54] TREE SHAKER

[75] Inventor: Basil W. Savage, Sr., Madill, Okla.

[73] Assignee: Savage Equipment, Inc.

[21] Appl. No.: 57,981

[22] Filed: Jul. 16, 1979

[51] Int. Cl.³ .......................................... A01G 19/00
[52] U.S. Cl. ............................................... 56/328 TS
[58] Field of Search .............. 56/328 TS, 328R, 329; 74/61, 78

[56] References Cited

U.S. PATENT DOCUMENTS

| | | | |
|---|---|---|---|
| 3,548,578 | 9/1968 | Shipley | 74/87 |
| 3,771,301 | 11/1973 | Favor | 56/328 TS |
| 4,080,840 | 3/1978 | Stone | 74/61 |
| 4,087,982 | 5/1978 | Golobay | 74/87 |
| 4,113,034 | 9/1978 | Carlson | 74/61 |
| 4,143,737 | 3/1979 | Erich | 74/61 |

*Primary Examiner*—Robert A. Hafer
*Attorney, Agent, or Firm*—Laney, Dougherty, Hessin & Beavers

[57] ABSTRACT

An improved tree shaker includes a clamp for gripping a tree and a vibrator for vibrating the clamp to shake the tree. The vibrator includes first and second eccentric weights mounted to rotate in substantially the same vertical plane about spaced parallel axes of rotation. The tree shaker further includes a frame having a first frame member and a slidable second frame member with a hydraulic ram connected between the first and second frame members for sliding the second frame member relative to the first frame member. The hydraulic ram is located parallel to and outwardly spaced from a sliding beam of the second frame member.

1 Claim, 6 Drawing Figures

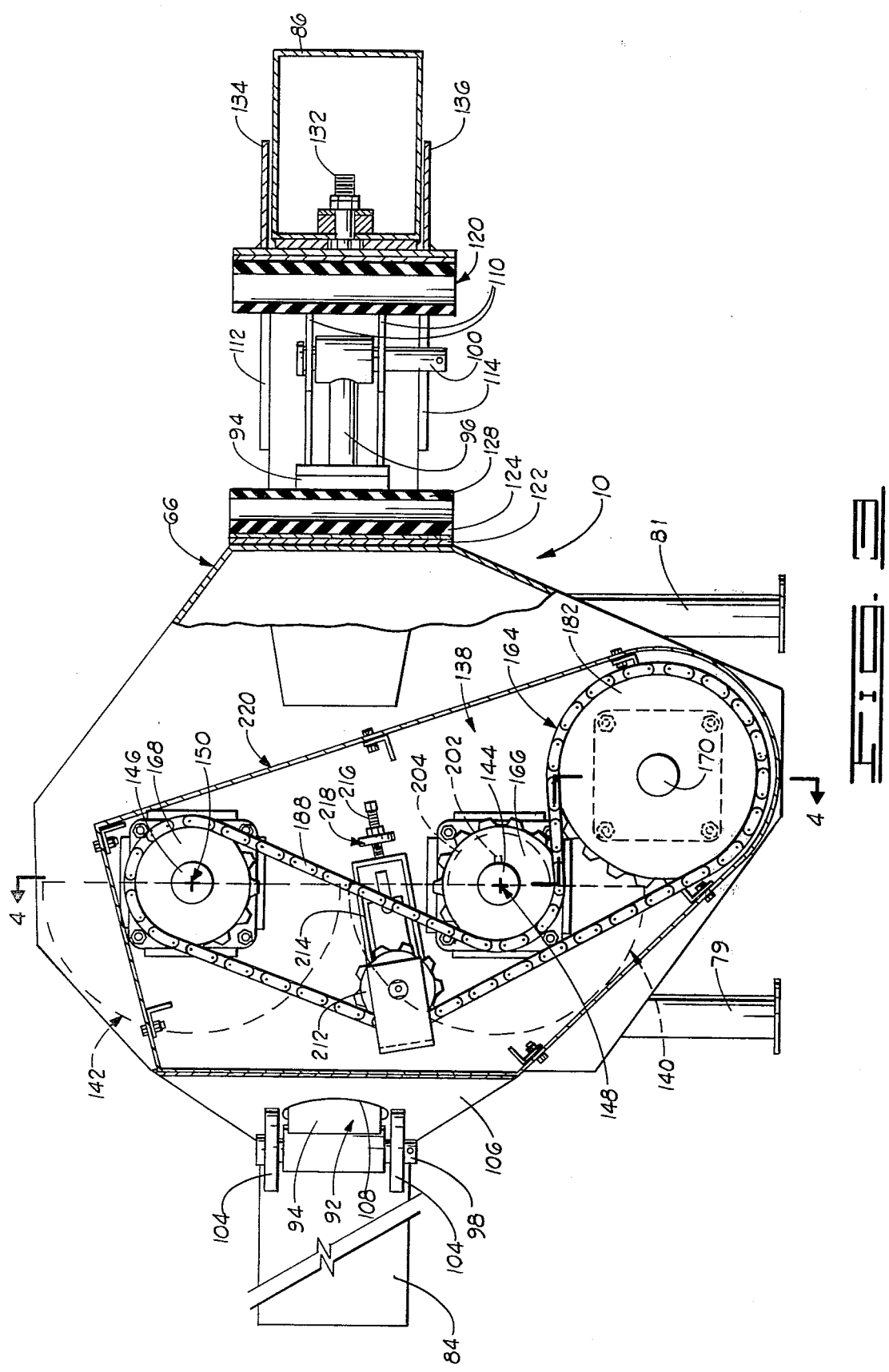

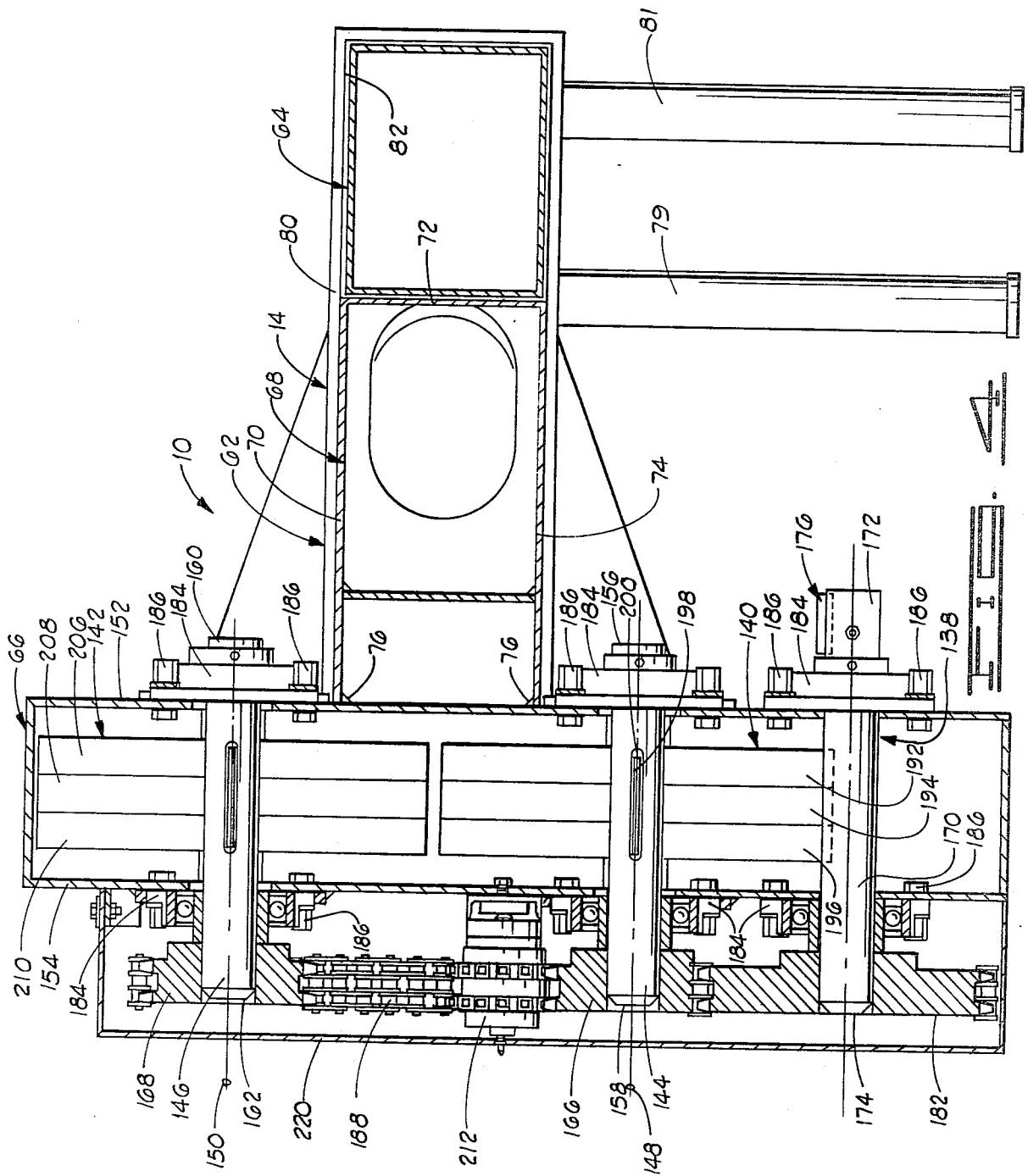

TREE SHAKER

BACKGROUND OF THE INVENTION

1. Field of the Invention

This invention relates generally to apparatus for shaking fruit and nut trees, and more particularly, but not by way of limitation, to tree shaking apparatus constructed for use with a conventional tractor power-take-off.

2. Description of the Prior Art

Two prior art devices for shaking trees, which devices have some similarities to the present invention are disclosed in U.S. Pat. Nos. 3,812,662 and 3,594,999, both to Savage.

Each of these prior art references disclose two eccentric weights rotating in substantially vertical planes to produce a vibrating force. The weights of each apparatus are not, however, constructed to rotate in substantially the same plane, but rather they rotate in spaced parallel planes. A disadvantage of having the two eccentric weights rotating in spaced planes is that the offset between the rotating weights creates a bending moment in their common shaft which causes undesirable loadings.

U.S. Pat. No. 3,812,662 shows a clamp means somewhat similar to that of the present invention. The clamp means of U.S. Pat. No. 3,812,622, however, has the hydraulic ram for extending the clamp means located within a tubular beam of the movable portion of the clamp means, whereas the present invention has such hydraulic ram offset from the sliding tubular beam.

It is seen, therefore, that although the prior art discloses apparatus for shaking trees having several of the features of the present invention, the present invention includes several distinct improvements providing important advantages over these prior art devices.

SUMMARY OF THE INVENTION

A tree shaking apparatus is provided which includes a clamp means for gripping a plant and a vibrator means for vibrating the clamp means to shake the plant. The vibrator means includes first and second eccentric weight means mounted to rotate about first and second substantially parallel spaced axes of rotation, said first and second weight means being arranged so that their respective centers of gravity rotate in substantially the same plane.

Further improvements over the prior art are provided in an improved frame structure, which among other things includes an improved extension means located parallel to and spaced outwardly from a sliding beam portion of the frame means so as to provide greater clamping forces with decreased hydraulic pressure requirements.

Many other features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 4 is a side elevation sectional view of the tree shaker of FIG 2, with the vibrator means being shown in section about line 4—4 of FIG. 3.

FIG. 6 is a plan view of the boom for suspending the tree shaker from the tractor.

DETAILED DESCRIPTION OF THE PREFERRED EMBODIMENTS

Figure 1:
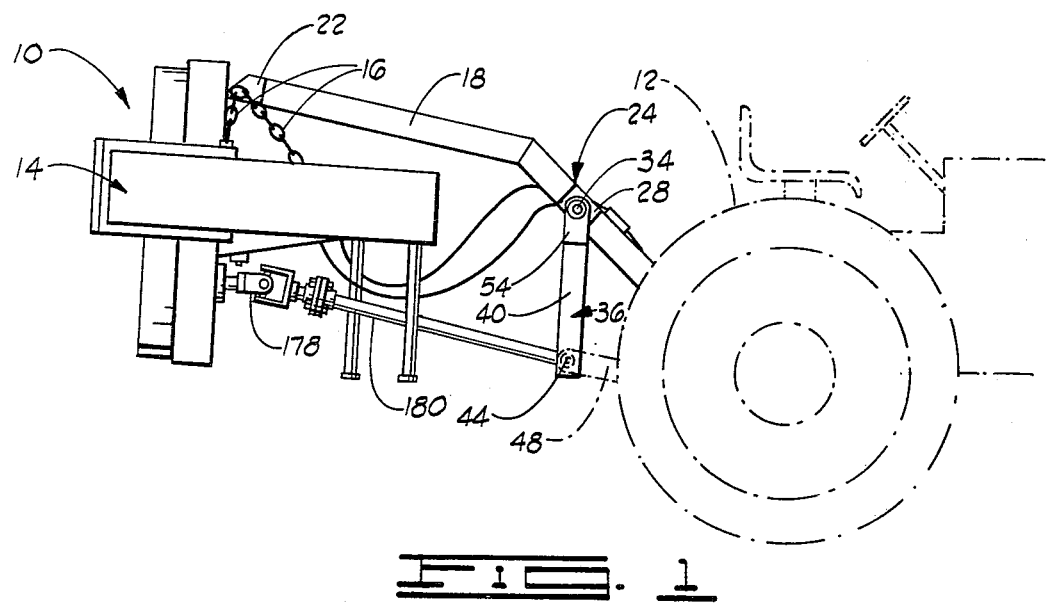
FIG. 1 is a right side elevation view of the tree shaker of the present invention, illustrating portions of a conventional tractor in phantom lines.

Referring now to the drawings, and particularly to FIG. 1, the tree shaker of the present invention, which may be generally referred to as an apparatus for shaking plants, is shown and generally designated by the numeral 10. The tree shaker 10 is constructed to be attached to and operated from a conventional tractor 12, a portion of which is illustrated in FIG. 1 in phantom lines.

The tree shaker 10 includes a frame 14 which is suspended by chains 16 from a boom 18. The boom 18 includes a forward end 20 (See FIG. 6) having an eye mounted thereon for connection to the central point (not shown) of a conventional three point tractor hitch assembly. The rear end of boom 18 includes a cross member 22 from which the chains 16 are suspended. A central reinforced portion 24 of boom 18 includes square tubular reinforcing members 26 and 28 having pivot pin holes 30 and 32 disposed therein.

Figure 5:
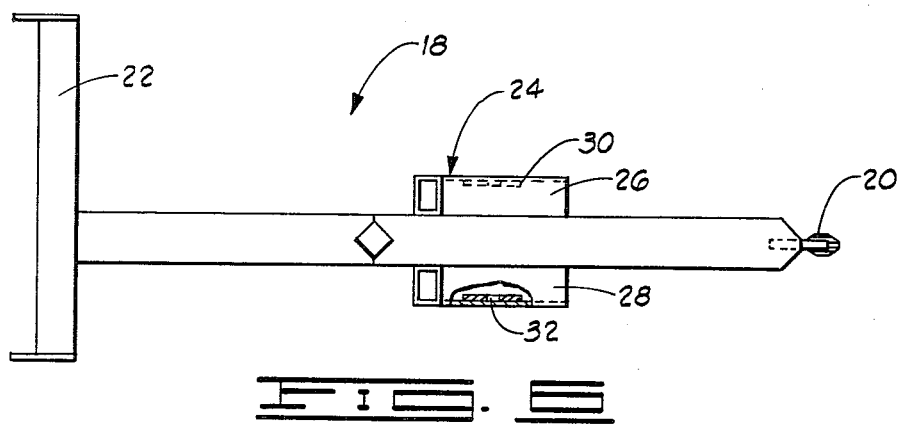
FIG. 5 is a rear elevation view of the yoke assembly for supporting the boom from the tractor.

A pivot pin 34 connects reinforced middle portion 24 of boom 18 to yoke assembly 36 (See FIG. 5). Yoke assembly 36 includes first and second angularly downward extending legs 38 and 40 having first and second stub pins 42 and 44, respectively, extending horizontally outward therefrom.

The stub pins 42 and 44 are connected to the two outer hitch points of the conventional three point tractor hitch, pin 44 being attached to hitch point 48 as shown in phantom lines in FIG. 1. The upper ends of legs 38 and 40 are connected by brace 50 which has a pair of upwardly protruding ears 52 and 54 having pivot pin receiving holes 56 and 58, respectively, disposed therein.

The central reinforced portion 24 of boom 18 is received between ears 52 and 54 and pivot pin 34 is then disposed through the pivot pin holes 56 and 58 of ears 52 and 54 and through holes 30 and 32 of reinforced portion 24 of boom 18.

Figure 3:
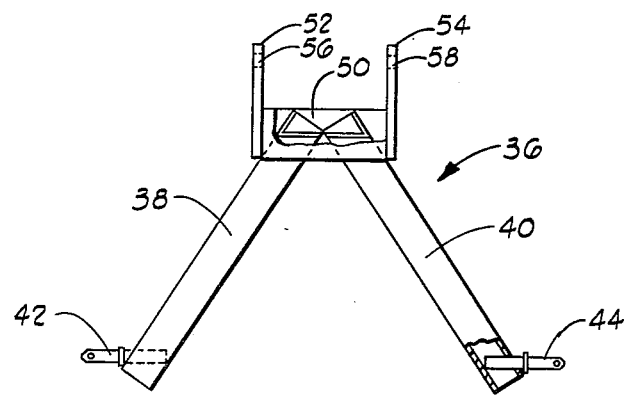
FIG. 3 is a rear elevation partly sectioned view of the tree shaker of FIG. 2, taken along line 3—3 of FIG. 2.
Figure 2:
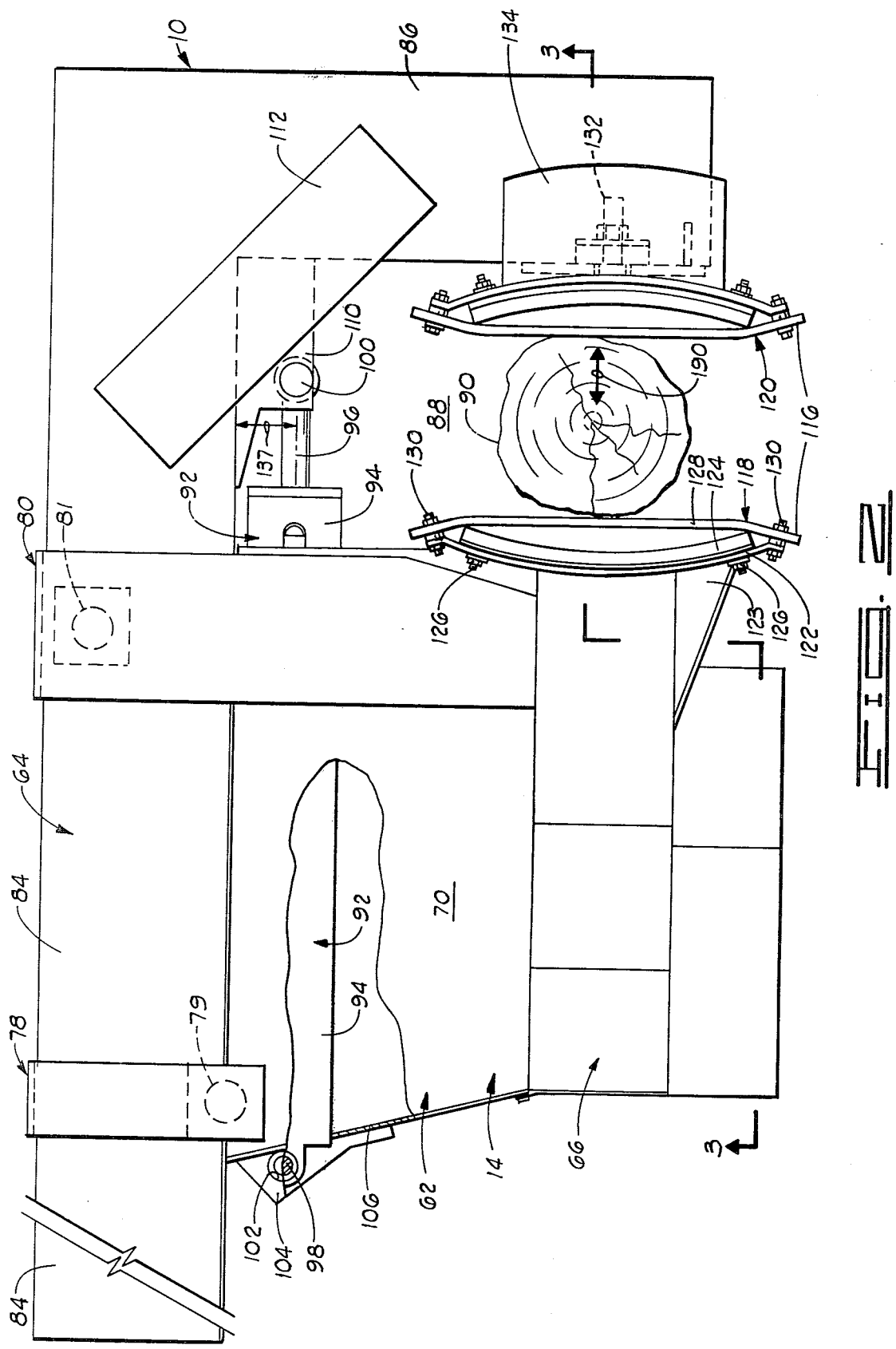
FIG. 2 is a plan view of the tree shaker with the boom and drive connections from the tractor removed.

Referring now to FIGS. 2, 3 and 4, the tree shaker 10 is thereshown with the boom 18 and yoke assembly removed. Throughout the remainder of this disclosure of terms "front" and "rear" will be used to refer to various features of tree shaker 10. "Front" refers to a portion closest to tractor 12, and "rear" correspondingly refers to features further placed from tractor 12.

The frame 14 of tree shaker 10 includes a first frame member 62 and a second frame member 64. First frame member 62 includes a vibrator housing 66, to the front end of which is attached a channel shaped frame member 68 (See FIG. 4) having an upper side 70, rear side 72, and bottom side 74. The front edges of top and bottom sides 70 and 74 are attached to housing 66 by welding as indicated at 76.

First and second U-shaped strap portions 78 and 80 are attached to channel shaped frame member 68 and extend forwardly therefrom to define a rectangular opening 82 (See FIG. 4) alongside front portion 72 of channel shaped frame member 68. First and second support legs 79 and 81, respectively, depend substantially downwardly from U-shaped straps 78 and 80, respectively, to maintain the plant shaking apparatus 10 in a substantially upright orientation as illustrated in FIGS. 3 and 4 when tree shaker 10 is rested upon a ground surface.

Second frame member 64 includes an elongated first beam 84 which is received within opening 82 and slidingly engages first frame member 62. Second frame member 64 includes a second beam 86 extending transversely from first beam 84. Second beam 86 is spaced from first frame member 62 thereby defining a space 88 between second beam 86 and first frame member 62, for receiving a tree 90.

A double acting hydraulic ram, which may generally be referred to as an extension means for sliding second frame member 64 relative to first frame member 62, is generally designated by the numeral 62. Hydraulic ram 92 includes a cylinder portion 94 with a piston portion 96 extending therefrom. The cylinder 94 is attached to first frame member 62 by first pin 98. The piston portion 96 is attached to second frame member 64 by second pin 100.

The first pin 98 is disposed in a hole 102 of a pin receiving bracket 104 attached to a side plate 106, which encloses a lefthand side of channel shaped frame member 68.

A portion of top 70 of channel shaped frame member 68 is cut away in FIG. 2 to illustrate the cylinder portion 94 of hydraulic ram 92 which is located within channel shaped frame member 68. Side panel 106 includes a hole 108 (See FIG. 3) disposed therethrough, through which cylinder portion 94 of hydraulic ram 92 protrudes.

Second pin 100 is connected to a second pin receiving bracket 110 which is welded to beams 84 and 86 of second frame member 64 at the connection therebetween.

Upper and lower reinforcing straps 112 and 114 are welded across the intersection of beams 84 and 86.

A clamp means generally designated by the numeral 116 includes first and second tree engaging portions 118 and 120 for gripping tree 90 therebetween.

First tree engaging portion 118 includes an arcuate backup plate 122 rigidly attached to first frame member 62. A backup plate cushion 124 is attached to backup plate 122 by bolts 126. A pad 128 covers backup plate cushion 124 and is attached to backup plate 122 by bolts 130. Pad 128 is resilient and is displaced toward cushion 124 when the clamp means 116 is clamped about tree 90. An angular bracket 123 is attached to vibrator housing 66 to provide additional support for arcuate backup plate 122.

Ram 92 provides a means for varying the distance between first and second tree engaging portions 118 and 120 of clamping means 116. The ram 92 is spaced outwardly a distance 137 from first beam 84 toward clamp means 116. The closer ram 92 is to clamping means 116 the more effectively clamping force is transmitted from ram 92 to clamping means 116.

Located within vibrator housing 66 is a vibrator means, generally designated by the numeral 138, for vibrating clamp means 116 to shake tree 90.

Vibrator means 138 includes first and second eccentric weight means 140 and 142. First and second weight means 140 and 142 are mounted upon first and second shafts 144 and 146, respectively, so as to rotate therewith.

First and second shafts 144 and 146 are vertically spaced one above the other so that axes of rotation 148 and 150 of first and second shafts 144 and 146, respectively, both lie in a single substantially vertical plane Axes 148 and 150 are parallel to each other.

As is best seen in FIG. 4, the second weight means 142 is located directly vertically above the first weight means 140 so that said first and second eccentric weight means 140 and 142 rotate in substantially the same plane of rotation, said axes of rotation 148 and 150 being substantially normal to said plane of rotation.

When the first and second eccentric weight means 140 and 142 are described as rotating in substantially the same plane of rotation, what is meant is that their centers of gravity rotate in substantially the same plane of rotation.

When the plane of rotation is described as being "substantially vertical", that term encompasses apparatus having the plane of rotation of the weight means slightly skewed from the vertical. For example, the apparatus disclosed in U.S. Pat. Nos. 3,812,662 and 3,594,999 each show eccentric weights rotating in a plane slightly skewed from the vertical. Apparatus such as those shown in the two referenced patents would be considered to have their eccentric weights rotating in substantially vertical planes. As previously noted, however, the weights in those two referenced patents do not rotate in the same plane but rather rotate in spaced parallel planes.

Vibrator housing 66 includes spaced front and rear walls 152 and 154, respectively. First shaft 144 includes first and second ends 156 and 158, rotatingly mounted in said front and rear walls 152 and 154, respectively. Second shaft 146 similarly includes first and second ends 160 and 162.

A chain and sprocket drive means generally designated by the numeral 164 provides power for rotating first and second shafts 144 and 146.

The second ends 158 and 162 of first and second shafts 144 and 146 extend outward past rear wall 154 of vibrator housing 166. First and second drive sprockets 166 and 168 are attached to second ends 158 and 162 of first and second shafts 144 and 146, respectively.

A third shaft 170 includes first and second ends 172 and 174 rotatingly mounted in front and rear walls 152 and 154, respectively. First end 172 of third shaft 170 includes a key end groove means 176 for connecting third shaft 170 to a universal joint 178 (see FIG. 1) of a drive shaft 180 connected to the power-take-off (not shown) of tractor 12.

A power sprocket 182 is attached to second end 174 of third shaft 170.

First, second and third shafts, 144, 146 and 170 are mounted within front and rear walls 152 and 154 by means of bearing mounts 184 attached to said walls by fastener means 186.

An endless drive chain 188 engages first and second drive sprockets 166 and 168 and power sprocket 182 for transmitting a driving force from the drive shaft 180 (see FIG. 1) to first and second shafts 144 and 146. Drive chain 188 is best seen in FIG. 3.

As is shown in FIG. 3 the drive chain 188 engages sprockets 166, 168 and 182 in such a manner that first and second weight means 140 and 142 are rotated in opposite directions.

In the operation of tree shaker 10 it is desired that the resultant force generated by vibrator means 138 act only along a line between the points of engagement of clamp means 116 with tree 90. This means it is desired that the vibrational force operates substantially only along the line indicated by numeral 190 in FIG. 2, said line 190 lying in a substantially horizontal plane.

To obtain this resultant force acting along line 190, the first and second weight means 140 and 142 are synchronized and co-ordinated through sprockets 166 and 168 and drive chain 188, so that when said first weight means 140 is at its lowest position, the second weight means 142 is at its highest position, and when first weight means 140 is at its highest position, the second weight means 142 is at its lowest position. In this manner, the varying substantially vertical force component generated by the first weight means 140 is continuously substantially equal and opposite to a varying substantially vertical force component generated by second weight means 142 so that the vertical components of force generated by weight means 140 and 142 cancel each other out. This leaves only the substantially horizontal force components generated by weight means 140 and 142 to act upon the frame 14.

As is best seen in FIG. 3, first and second eccentric weights means 140 and 142 each comprise a semi-circular shape.

As is best seen in FIG. 4, first eccentric weight means 140 includes first, second and third semi-circular weights 192, 194 and 196. Weights 192, 194 and 196 are detachably mounted upon first shaft 144 by means of a key 198 received in groove 200 of first shaft 144. Key 198 similarly engages a groove 202 (See FIG. 3) in a collar portion 204 of each of the weights 192, 194 and 196.

Similarly second eccentric weight means 142 includes first, second and third detachably mounted semi-circular weights 206, 208 and 210.

The weights 206, 208 and 210 of second weight means 142 are located directly vertically above the weights 192, 194 and 196, respectively, of first weight means 140 so that the force generated by vibrator means 138 can be decreased by removing complementary weights of first and second weight means 140 and 142.

For example, the weights 194 and 208 of first and second weight means 140 and 142, respectively, can both be removed thereby leaving two weights on each of the weight means. The two remaining weights 206 and 210 of the second weight means 142 are located directly above the two remaining weights 192 and 196, respectively, of the first weight means 140 so that the centers of gravity of first and second weight means 140 and 142 still rotate in a single substantially vertical plane of rotation, which plane of rotation remains coincident with resultant force line 190.

When weights 194 and 208 are removed they are placed by spacers (not shown) so that remaining weights 192, 196, 206 and 210 are retained in their original positions on shafts 144 and 146.

Still further force reduction can be made by removing the outside weights 192, 196, 206 and 210 and retaining the center weights 194 and 208. Again, spacers (not shown) are used to keep weights 194 and 208 in their original positions.

As is best seen in FIG. 3, an adjustment sprocket 212 engages drive chain 188 for applying a tensional loading to the same to maintain it relatively snugly against the other sprockets.

Adjustment of sprocket 212 is provided by a sliding bracket 214 the position of which is maintained by adjustment screw 216 which threadedly engages threaded bracket 218 which is welded to rear wall 154 of vibrator cover 66.

The moving components of the chain and sprocket drive means 138 are enclosed by a protective covering 220 which isolates those moving components from exposure to the atmospheric elements.

Thus, the tree shaker of the present invention is well adapted to attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. In a plant shaking apparatus of the type including clamp means for gripping a plant and vibrator means for vibrating said clamp means to shake said plant, the improvement wherein said vibrator means comprises:

first and second eccentric weight means mounted to rotate in opposite directions in substantially the same first substantially vertical plane about axes of rotation substantially normal to said first plane, said axes of rotation of said first and second weight means being spaced and parallel to each other and lying in a second substantially vertical plane, said second plane being substantially perpendicular to said first plane; and a drive means for rotating first and second weight means, said drive means and first and second weight means being so co-ordinated that when said first weight means is at its lowest position said second weight means is at its highest position, and when said first weight means is at its highest position said second weight means is at its lowest position, so that a varying substantially vertical force generated by said first weight means is continuously substantially equal and opposite to a varying substantially vertical force generated by said second weight means;

wherein said first weight means includes a first plurality of weights detachably mounted upon a first shaft so that centers of gravity of said weights of said first plurality of weights are spaced parallel to said axis of rotation of said first weight means; and wherein said second weight means includes a second plurality of weights detachably mounted upon a second shaft, said weights of said first and second pluralities of weights being arranged so that selected weights may be removed from each of said first and second pluralities of weights to reduce the vibrating force produced by said first and second weight means while maintaining the same first substantially vertical plane of rotation of the centers of gravity of said first and second weight means.

* * * * *